United States Patent [19]

Weiss

[11] Patent Number: 4,856,062

[45] Date of Patent: Aug. 8, 1989

[54] COMPUTING AND INDICATING DEVICE

[76] Inventor: Kenneth Weiss, c/o Security Dynamics Tech., Inc., 2067 Mass. Ave., Cambridge, Mass. 02140

[21] Appl. No.: 124,666

[22] Filed: Nov. 24, 1987

Related U.S. Application Data

[63] Continuation of Ser. No. 676,626, Nov. 30, 1984, Pat. No. 4,720,860.

[51] Int. Cl.⁴ .............................................. H04L 9/00
[52] U.S. Cl. ......................................... 380/23; 380/25
[58] Field of Search .................................... 380/23–25, 380/50, 52

[56] References Cited

U.S. PATENT DOCUMENTS

| | | | |
|---|---|---|---|
| 4,575,621 | 3/1986 | Dreifus | 380/23 |
| 4,599,489 | 7/1986 | Cargile | 380/23 |
| 4,710,613 | 12/1987 | Shigenega | 380/25 |
| 4,720,860 | 7/1988 | Weiss | 380/23 |
| 4,731,841 | 3/1988 | Rosen et al. | 380/23 |

Primary Examiner—Salvatore Cangialosi
Attorney, Agent, or Firm—M. Lawrence Oliverio

[57] ABSTRACT

A portable hand held computing and indicating device for use in a verification system of the type wherein a first non-predictable code is generated at a first mechanism in accordance with a predetermined algorithm in response to both a unique static variable and a dynamic variable and a second non-predictable code is generated at a second mechanism in accordance with the predetermined algorithm in response to both the unique static variable and a second dynamic variable which corresponds to the first variable. The non-predictable codes are compared at the second mechanism to effect verification. The device forms the first mechanism and includes a processor having the algorithm preprogrammed therein and a means for storing a static variable which is unique for each device. The device also includes a means for generating a time varying dynamic variable which is substantially the same as that generated at the second mechanism at a given instant of time. The stored unique variable and the currently generated dynamic variable are applied to the processor and the resultant non-predictable code is visually displayed. The program for executing the algorithm and the static variable are preferably stored in volatile memory which causes the program and the static variable to be erased if any effort is made to gain access thereto. All or a portion of the static variable may appear in visually perceptible form on the device.

11 Claims, 1 Drawing Sheet

COMPUTING AND INDICATING DEVICE

CROSS-REFERENCE TO OTHER APPLICATION

This application is a continuation of U.S. Ser. No. 76,626 filed Nov. 30, 1984, now U.S. Pat. No. 4,720,860 in the name of the same inventor. U.S. application Ser. No. 802,576, filed Nov. 27, 1985, in the name of the same inventor is a continuation in part of the application Ser. No. 676,626 and is related to this application.

BACKGROUND OF THE INVENTION

The present invention relates to a portable, hand-held computing and indicating device for generating and visually displaying non-predictable codes and is adapted for use in a verification and identification system of the type described in the application Ser. No. 676,626.

There often arises a need to prevent all but selected authorized persons from being able to carry out some defined transaction (such as granting of credit) or to gain access to electronic equipment or other system, facility or data (hereinafter "clearance or access"). Prior methods for preventing unauthorized clearance o access typically involve devices which limit access to the subject data, facility, or transaction to those who possess a unique physical device, such as a key or who know a fixed or predictable (hereinafter "fixed") secret code. The problem inherent in relying on a fixed code or unique physical device as the means to gain such selective clearance or access is that would be unauthorized users need only obtain possession of the fixed code or unique device to gain such clearance or access. Typical instances of fixed codes include card numbers, user numbers or passwords issued to customers of computer data retrieval services.

Application Ser. No. 676,626 describes a system which provides a high level of security while permitting verification to be achieved without requiring any physical connection or electrical connection between the device in possession of the individual and a central verification device, thus permitting remote verification as by telephone. The system is also relatively simple and requires only one way communication from the individual seeking verification to the central verification computer. In particular, this system has a first computer which generates a first non-predictable code in response to a static variable applied to the computer, the non-predictable code being generated in accordance with a predetermined algorithm. The non-predictable code generated at a given time is displayed and may be communicated to a second computer at the verification station which computer generates a second non-predictable code utilizing the same algorithm and in response to the fixed variable and a second time dependent variable generated at the second computer. The two non-predictable codes are compared and verification is signified if the codes match. This invention relates to a portable hand held device which may be utilized as a first computer in the above system.

SUMMARY OF THE INVENTION

The present invention relates to a hand held computing and indicating device for use in a verification system of the type wherein a first non-predictable code is generated at a first mechanism in accordance with a predetermined algorithm in response to both a unique static variable and a dynamic time dependent variable and a second non-predictable code is generated at a second mechanism in accordance with the predetermined algorithm in response to both the unique static variable and a second dynamic time dependent variable which corresponds to the first variable. The non-predictable codes are compared at the second mechanism to effect verification. The device, which forms the first mechanism, includes a processor having an algorithm preprogrammed therein and a means for storing a static variable which is unique for each device. The device also includes a means for generating a time-varying dynamic variable which is substantially the same as that generated at the second mechanism at a given instant of time. The stored unique static variable and the currently generated dynamic variable are applied to the processor and the resulting non-predictable code is visually displayed. The program for executing the algorithm and the static variable are preferably stored in a volatile memory which causes the program and the static variable to be erased if any effort is made to gain access thereto. All or a portion of the static variable may appear in visually perceptible form on the device.

BRIEF DESCRIPTION OF THE DRAWINGS

Other objects, features, and advantages will be apparent from the following detailed description of preferred embodiments thereof taken in conjunction with the accompanying drawings in which.

DETAILED DESCRIPTION OF THE INVENTION

The following discussion describes the most preferred embodiments of the invention.

Figure 1:
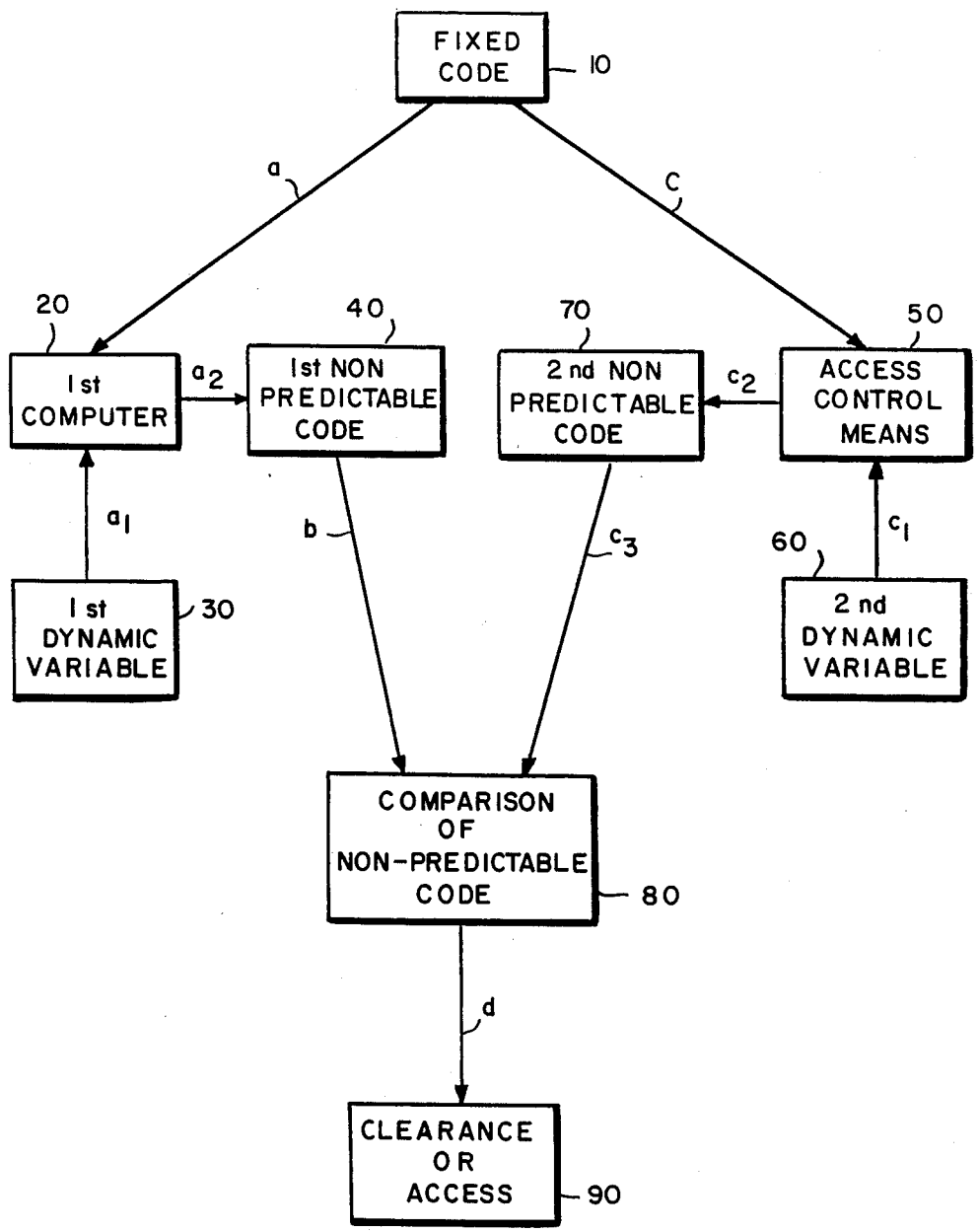
FIG. 1 is a block diagram of a basic apparatus and method according to the invention of the application Ser. No. 676,626 for generating and comparing non-predictable codes.
Figure 1A:
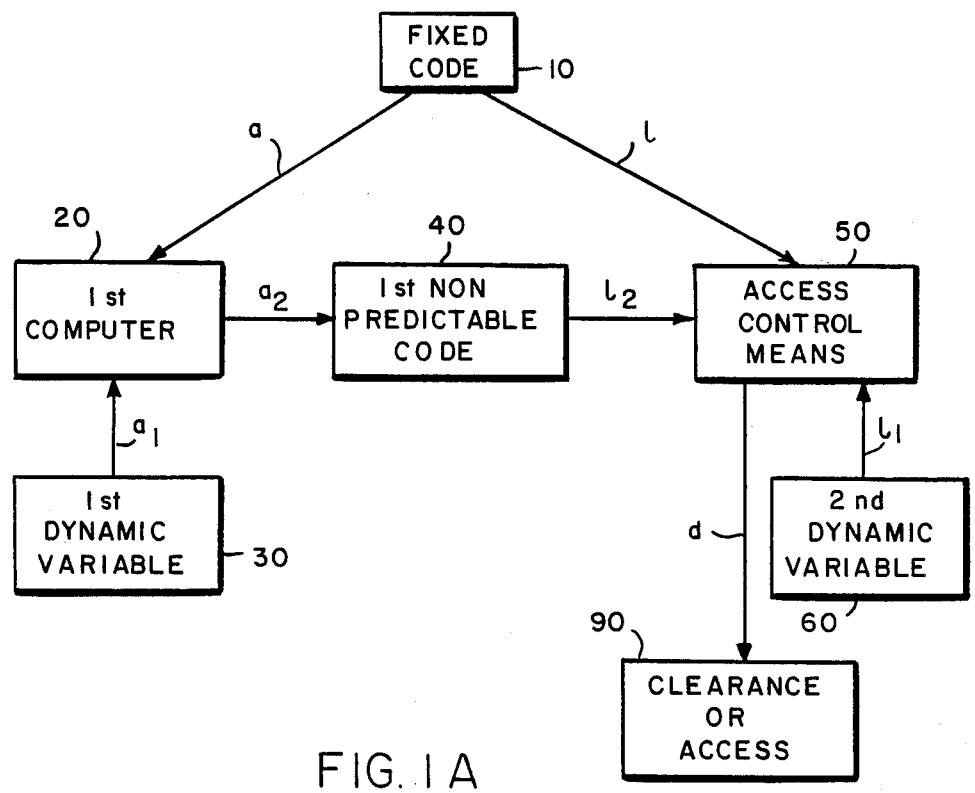
FIG. 1A is a block diagram of a preferred apparatus and method for generating and comparing non predictable codes where a means for comparing non predictable codes is included in a calculator which generates a non-predictable code.
Figure 2:
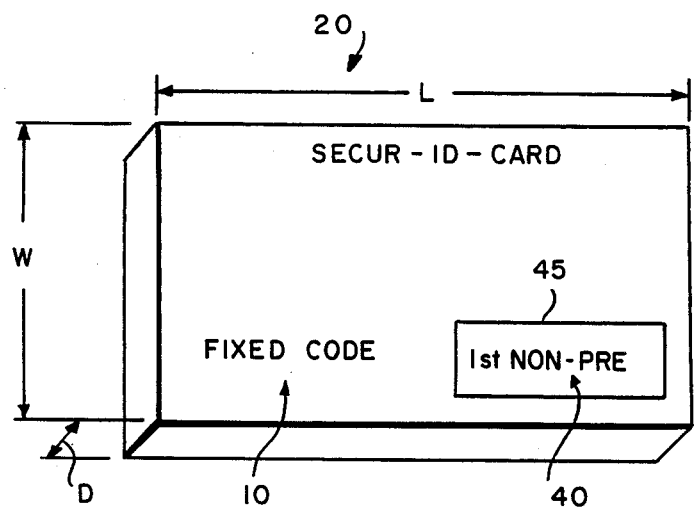
FIG. 2 is a front isometric view of a credit card sized device of this invention for calculating a first non-predictable code for use in gaining clearance or access according to the invention.

In accordance with the invention an authorized person is provided with a fixed secret code 10, FIGS. 1, 1A, 2, typically a number, which is unique to that individual. In the case of a credit or bank/cash card 20, FIG. 2, that number 10 may be printed on the card itself such that if the authorized owner of the card forgets the number, it can be quickly retrieved by reference to the card or other permanently printed form of the fixed code 10. Where the fixed code 10 is provided in permanent printed form on or in close connection with the apparatus of the invention there is also preferably provided a additional portion of the fixed code 10 which the authorized user memorizes in order to further guard against misappropriation of the fixed code. The fixed code may alternatively be used to identify an authorized terminal which has been issued by the authority presiding over the granting of clearance or access.

In order to generate a code which will ultimately give the user clearance or access, the fixed code must be input into a predetermined algorithm which manipulates the fixed code as a static variable. The algorithm is typically provided to the user in the form of a first calculator which is loaded with a program for carrying out the predetermined algorithm. With reference to the Figures the calculator preferably comprises an electronic computer 20 and most preferably comprises a microprocessor and a sufficient amount of volatile dynamic memory to store and carry out the functions of the predetermined algorithm. The computer 20 is most preferably provided in a card 20, FIG. 2, having the appearance and approximate size of a credit card.

Such credit card sized computer 20, FIG. 2, also preferably includes a conventional liquid crystal display 45 for displaying the ultimate non predictable code 40 generated by the algorithm. The non-predictable code 40 thus generated may be visually observed by the user for eventual input into an access control means 50, FIGS. 1, 1A. As shown in FIG. 2, the preferred form of computer 20 has a length L of about 3.3 inches, a width W of about 2.1 inches and a depth D of less than about 0.7 inches. In addition or as an alternative to providing microprocessor 20 with a liquid crystal display 45 for visual observation of the first non-predictable code 40, computer 20 may include means for machine reading the first non-predictable code 40 to the access control means 50, FIG. 1A, or may include sound producing or other means for personally sensing the first non-predictable code 40.

In addition to using the fixed code 10 as a static variable the predetermined algorithm is designed to utilize a second variable, a dynamic variable 30, 60, FIGS. 1, 1A, to calculate the non predictable codes 40, 70 which ultimately give access or clearance 90 to the user. The dynamic variable may comprise any code, typically a number, which is defined and determined by the interval of time in which the static variable 10 is put into the algorithm. The dynamic variable is most preferably defined by the date and the minute in which the static variable is input into the predetermined algorithm. A dynamic variable thus defined can be seen to change every minute. The dynamic variable could alternatively be defined according to an interval of time, e.g., 2 minutes, 5 minutes, 1 hour and the like. A dynamic variable thus defined would alternatively change every 1 minute, 2 minutes, 5 minutes, 1 hour or passage of any other predetermined interval of time.

With reference to FIG. 1 the most preferred means of establishing such a dynamic variable is via a time keeping means, such as an electronic digital clock, which by conventional means automatically makes the dynamic variable to a means which automatically inputs, steps $a_1$ or $c_1$, the date and specific interval of time (e.g., 1 minute, 2 minutes, 5 minutes, etc.) into the predetermined algorithm in response to the input, step a or c, of the static variable 10. The date and time thus generated by the time keeping means may itself be independently manipulated according to another predetermined algorithm prior to input into the first predetermined algorithm of the dynamic variable. The fact that the dynamic variable 30 or 60 being input into the predetermined algorithm constantly changes in absolute value with passage of successive intervals of time of predetermined duration means that the code 40 or 70 generated according to the predetermined algorithm is also constantly changing with successive intervals of time and is thereby completely non-predictable.

The non-predictability of the codes 40, 70, FIG. 1, generated in the manner described above may be enhanced by the fact that the predetermined algorithm (together with the static variable 10 and dynamic variable 30 input thereinto) may preferably be stored in the calculator 20 provided to authorized users in volatile dynamic electronic memory which is encapsulated with an energizing means which destroys the algorithm, the static variable 10, and the dynamic variable 30 when the electronic memory is invaded, interrupted or violated in any way. The predetermined algorithm thus stored in such volatile electronic memory cannot be discovered by a would-be thief because the entire memory including the predetermined algorithm is destroyed upon invasion of the memory.

In a most preferred embodiment of the invention where the static variable/fixed code 10 is stored in such volatile dynamic memory and by conventional means is automatically input step a, FIGS. 1, 1A, into the algorithm of the first computer at regular intervals of time. Such automatic inputting of the fixed code 10 may thereby work in conjunction with the automatic definition and inputting of the first dynamic variable 30 into the predetermined algorithm of the first computer 20 to effect completely automatic generation of the first non-predictable code 40 at regular intervals of time.

The invention most preferably contemplates providing authorized personnel with a computer 20, FIGS. 1, 1A, 2, only, but not with knowledge of the predetermined algorithm included in the computer 20. Authorized personnel are, therefore, provided with a computer 20 capable of carrying out an algorithm which is unknown to such authorized personnel.

In the most preferred embodiment of the invention where the predetermined algorithm provided to authorized users is stored in a volatile dynamic memory encapsulated with an energizing means which destroys the algorithm upon invasion of the memory, the only means of gaining unauthorized clearance or access 90 is to misappropriate possession of the original computer 20 itself (and knowledge of the fixed code/static variable 10). In an embodiment of the invention where the means for establishing the dynamic variable 40 is not incorporated into the computers 20 themselves, would-be unauthorized users would further require possession of an appropriate means for defining the dynamic variable according to the appropriate interval of time in which the fixed code/static variable 10 is input, step a, FIGS. 1, 1A, into the predetermined algorithm of the computer 20. The static variable/fixed code 10 is preferably stored within volatile dynamic memory and automatically input into the predetermined algorithm of the first computer for computation of the first non-predictable code.

The algorithm may alternatively be designed to manipulate more than one fixed code and/or more than one dynamic variable. Several means for inputting each fixed code and dynamic variable may be included in the calculator provided to users and in the access control means. Each dynamic variable is preferably defined by the interval of time in which one or more of the fixed codes (selected static variables) are input into the algorithm.

It can be seen, therefore, that the predetermined algorithm can comprise any one of an infinite variety of algorithms. The only specific requirement for a algorithm to be suitable for use in the present invention is that such algorithm generate a non-predictable code on the basis of two classes of variables, static variables (the fixed codes) and dynamic variables such as described hereinabove. A non-predictable code C which is ultimately generated by the predetermined algorithm, f(x,y), may be expressed mathematically as:

$$f(x,y) = C$$

where x is a static variable/fixed code and y is a dynamic variable. Where several (n) static variables ($x_1$ $x_2$ ... $x_n$) and several (n) dynamic variables ($y_1$ $y_2$ ... $y_n$) are intended for use in generating non-predictable codes, a non-predictable code thus generated may be expressed mathematically as $f(x_1, x_2, ... x_n, y_1, y_2, ... y_n) = C$.

The specific form of the algorithm only assumes special importance as part of the invention, therefore, when the algorithm is capable of being discovered by would be unauthorized users. In the most preferred embodiment of the invention where the algorithm is completely undiscoverable by virtue of its storage in a volatile dynamic electronic memory which destroys the algorithm upon attempted invasion of the encapsulated memory, the specific form of the algorithm comprises only an incidental part of the invention. The mere fact of the use of some algorithm to manipulate the fixed code and the dynamic variable does, however, comprise a necessary part of the invention insofar as such an algorithm generates the ultimately important non-predicable code.

With reference to FIG. 1, after a first non predictable code 40 is generated as described above, such first non predictable code is compared 80 with another "second" non-predictable code 70 which is also generated by the user by putting, step c, the fixed code/static variable 10 into an access control means 50 which contains he same predetermined algorithm used to generate the first non predictable code 40. With reference to FIG. 1A, in a preferred embodiment of the invention the first non-predictable code 40 is put, step $e_2$ into the access control means 50 essentially immediately after the fixed secret code 10 is put into the access control means 50 (i.e., step $e_2$ is carried out essentially immediately after step e) in order to gain clearance or access 90.

With reference to FIG. 1A, if steps e and $e_2$ are not carried out within the same interval of time as step a was carried out, then step c will not generate a second dynamic variable 60 which will allow the predetermined algorithm of the access control means 50 to generate a non predictable code 70 which matches the 1st non-predictable code 40.

The second calculator typically comprises an access control means 50, FIG. 1, containing a program for carrying out the algorithm and a second means for establishing a second dynamic variable 60 which is defined by the interval of time in which the user puts, step c, the fixed code/static variable 10 into the access control means 50. The second means for establishing the second dynamic variable most preferably comprises a second time-keeping means, such as a digital clock, which is synchronized with the first time-keeping means so as to generate a dynamic variable 60 which when inputted into the access control means will generate a non-predictable code 70 which matches code 40 only when steps b and c, FIG. 1 (or steps e and $e_2$, FIG. 1A) occur within the same interval of time. Such second time keeping means preferably defines the second dynamic variable 60 by the date and minute (or other predetermined interval of time) in which the fixed code/static variable 10 is put, step c, into the access control means.

The second time keeping means is preferably synchronized with the first time keeping means such that if the fixed code 10, FIG. 1, is put into the access control means 50 within the same predetermined interval of time (i.e. 1 minute, 5 minutes, 1 hour, etc.) as the fixed code 10 is input into the first computer 20, the second time keeping means generates, step $c_1$, the identical dynamic variable 60 as the first time keeping means generates, step $a_1$, and the algorithms of the first computer 10 and the access control means 50 thereby generate, steps $a_2$ and $c_2$, identical and matching non-predictable codes. As with the first time keeping means the second time keeping means preferably puts, step $c_1$, the second dynamic variable 60 automatically into the access control means 50 in response to the putting, step c, of the fixed code/static variable 10 into the access control means 50. Steps $a_1$ and $c_1$, therefore, preferably occur automatically upon the carrying out of steps a and c respectively.

With reference to FIG. 1, once the second non predictable code 70 is generated, step $c_2$, by the second means for calculating 50, the first non predictable code 40 is compared 80 with the second non predictable code 70 and if they match the user is granted clearance access 90. The means for comparing the two independently generated non-predictable codes 40, 70, typically comprises a comparison algorithm included in a computer into which the first non-predictable code 40 and the second non-predictable code 70 are input, steps b, $c_3$, after they are generated. Steps b and $c_3$ are preferably carried out automatically in the conventional manner.

The authorized user of the first computer 10, FIG. 1, is typically required to personally sense the first non-predictable code 40 after steps a, $a_1$, and $a_2$ are completed (e.g. by sight, sound or otherwise) and then communicate, step c, the first non-predictable code to the means for comparing 80. The second non-predictable code however is preferably automatically communicated to the means for comparing 80.

Automatic communication of the second non-predictable code to the means for comparing, step $c_3$, is preferably accomplished by including a program for comparing the non-predictable codes in the access control means 50 itself, whereby the comparison program communicates with the predetermined algorithm included in the access control means 50. The second non-predictable code 70 may alternatively by automatically communicated, step $c_3$, to a separate device including a conventional means for comparing the non-predictable codes.

FIG. 1A depicts in block form the sequence of steps that would be carried out in the most preferred form of the invention where the access control means 50 includes the means for comparing the non-predictable codes. Fixed code 10 is input, step a (also preferably automatic), into first computer 20 and the first dynamic variable 30 is automatically input, step $a_1$, into the first computer 20 in response to the carrying our of step a. The first non predictable code 40 is then generated, step $a_2$, essentially automatically after the fixed code 10 is input, step a, into the first computer 20. The first non-predictable code 40 is personally sensed by the user and the fixed code 10 and the first non-predictable code 40 are then input by conventional telephonic/electronic means, steps e and $e_2$, into the access control means 50. By conventional means step a inputs the fixed code 10 into the predetermined algorithm and step $e_2$ communicates the first non-predictable code 40 to the means for comparing the first 40 and second 70 non-predictable codes. The second dynamic variable 60 is automatically input, step $e_2$, in response to the carrying out of step e. The second non-predictable code 70, FIG. 1, is automatically generated, step $c_2$ by access control means 50 in response to the carrying out of steps e and $e_1$, FIG. 2. The second non-predictable code 70, FIG. 1, is automatically communicated to the comparison means 80 included in the access control means 50 of FIG. 1A. Step $e_2$ is preferably carries out essentially immediately after step e is effected. The comparison means 80 included in the access control means 50, FIG. 1A, thereby compares the non-predictable codes 40, 70, FIG. 1, essentially automatically upon the completion of steps e and $e_2$. With reference to FIG. 1A, where the access control means 50 is physically remote from the first calculator 20, the fixed secret code 10 and the first non-predictable code 40 are typically transmitted together (i.e. the fixed code 10 first and the non-predictable code 40 following immediately thereafter) to access control means 50 in the conventional manner. Such transmission, steps e and $e_2$, is typically effected by telephonic transmission with or without the aid of a conventional modem. In the most preferred embodiment of the invention, for example, where the first calculator comprises a credit-card sized microprocessor 20, FIG. 2, having a liquid crystal display 45, the user accomplishes step $e_2$, FIG. 1A, by first reading the non-predictable code 40 from the liquid crystal display and then telephonically transmitting the fixed code 10 and the non predictable 40 code to the access control means 50. The actual transmission of the fixed code 10 and the non-predictable code 40 may alternatively be effected by reading the codes 10 and/or 40 into the access control means 50 by conventional electronic or mechanical means.

In most practical applications of the inventions the granting of clearance or access 90, is effected automatically by conventional electronic means if the non-predictable codes match when compared with each other.

With reference to FIG. 1, steps a and c must be performed within the same interval of time of predetermined duration in order to generate equivalent first 30 and second 60 dynamic variables and, a fortiori, matching first 40 and second 70 non-predictable codes.

In a preferred embodiment of the invention, step a, FIGS. 1, 1A, is carried out automatically by suitable electronic means provided in the first computer 20. Where step a is carried out automatically, the first non predictable code 40 is, therefore, generated completely automatically by first computer 20 every minute, 2 minutes or other predetermined interval of time. In such a preferred embodiment, therefore, the invention will generate matching non predictable codes 40, 70 is step c, alone, is carried out by the user within the same minute or other predetermined interval of time in which the dynamic variables 30, 60 are constantly being established and re established by synchronized time keeping means. With reference to FIG. 1A, in a most preferred embodiment of the invention where step $e_2$ occurs immediately after setp 3, the user must carry out both of steps e and $e_2$ within the same interval of time as the first computer 20 has automatically generated the first non predictable code 40.

FIG. 2 depicts the most preferred form of the calculator 20 of this invention which is provided to authorized users for generating the first non-predictable code 40. As shown in FIG. 2 the calculator 20 is of substantially the same size as a conventional credit card and includes a conventional liquid crystal display 45 for displaying the first non-predictable code 40 to the user. The credit card/computer 20, FIG. 2, typically bears the identity of the fixed code 10 printed on its face, and includes both the means for generating the first dynamic variable 30, FIGS. 1, 1A, and a microprocessor having a sufficient amount of volatile dynamic memory to include the predetermined algorithm which generates the first dynamic variable.

In the form of the invention where the goal is to grant access 90 to data stored in one or more host computers remote from the first computers issued to authorized users, an access control means 50 is typically located in close physical proximity to such remotely located host computers such as in a host computer room.

The access control means 50 itself typically comprises one or more master access devices, physically remote from the first computers 20 issued to users. Such master access control devices include a dictionary of many or all of the unique fixed codes issued to authorized personnel (or assigned to authorized terminals).

The access control means 50 may be portable such that it may be carried by a security guard stationed at a central access location in a guarded building or other facility. A security guard thus in possession of such an access control mechanism would typically read the fixed 10 and non-predictable code 40 appearing on the card 20, FIG. 2, of an authorized person and input such codes 10, 40 into the portable access control mechanism 50 to determine whether the bearer of the card is truly in possession of a first computer 20 which was issued by the authority establishing the secret predetermined algorithms.

As described herein protection of the secrecy of the predetermined algorithm is preferably accomplished in the calculators provided to authorized personnel by virtue of its storage in volatile dynamic memory and encapsulation with a volatile dynamic energizing means. With respect to the algorithm provided in the access control means secrecy may be maintained in a similar manner or other conventional manner, e.g., by physically guarding the access control means or requiring additional access/user codes to gain direct access. Where all programs, data and results of operation are stored in such volatile dynamic memory, the same are similarly protected against invasion.

Although the invention contemplates some form of communication of the result of operation carried out on the first computer 20, FIGS. 1, 1A, to the access control means 50 (or the comprison means 80, if physically separated from the access control means 50) in order to compare the non-predictable codes 40, 70, the invention does not contemplate a talking between the first computer 20 and the access control means 80 or any other electronic device. Therefore, after the first computer 20 has calculated the first non-predictable code 40, no other information need be communicated to the first computer 20 from another device in order to gain clearance or access.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. In a verification system wherein a first mechanism generates a first non-predictable code in accordance with a predetermined algorithm in response to both a unique static variable and a dynamic variable, a second mechanism generates a second non-predictable code in accordance with the predetermined variable and a second dynamic variable corresponding to the first dynamic variable, and means are provided for comparing the two non-predictable codes, a portable, hand-held computing and indicating device forming the first mechanism comprising:

a processor having said algorithm preprogrammed therein; means for causing the program stored in said processor to be erased if an effort is made to gain access to the program;

means for storing a unique static variable in said device;

means for generating a time varying dynamic variable, said means being adapted to generate the same dynamic variable as that generated at said second mechanism at substantially the same instant of time;

means for applying the stored unique static variable and the currently generated dynamic variable to said processor, said processor being adapted to generate said first non-predictable code in response to the two variable applied thereto; and means for affording person sensing of the non-predictable code currently being generated by said processor.

2. A device as claimed in claim 1 wherein the device is in the form of a credit-card sized card having the processor encapsulated therein.

3. A device as claimed in claim 2 wherein said card has a length of approximately 3.3 inches, a width of approximately 2.1 inches and a depth of less than approximately 0.07 inches.

4. A device as claimed in claim 1 wherein said means for affording personal sensing includes means for visually displaying said non predictable code.

5. A device as claimed in claim 4 wherein said means for visually displaying is a liquid crystal display.

6. A device as claimed in claim 1 wherein said means for affording personal sensing includes means for producing an audio representation of said non-predictable code.

7. A device as claimed in claim 1 wherein said means for generating a time varying dynamic variable is an electronic clock generator.

8. A device as claimed in claim 1 wherein the means storing the static variable is a dynamic storage; and wherein the means for causing erasure of the program causes erasure of both the program and the static variable in the event an effort is made to gain access thereto.

9. A device as claimed in claim 1 wherein the static variable appears in visually perceptible form on said device.

10. A device as claimed in claim 1 wherein a predetermined portion of the static variable appears in visually perceptible form on said device;

whereby only an individual knowing the remaining portion of the static variable will be able to successfully use the device.

11. A device as claimed in claim 1 including means for machine reading the non-predictable code being generated by said processor to the second mechanism.

* * * * *